United States Patent
Maheshwari et al.

(10) Patent No.: US 8,567,467 B2
(45) Date of Patent: Oct. 29, 2013

(54) PROCESS AND APPARATUS FOR PRODUCING COMPOSITE STRUCTURES

(75) Inventors: Mahendra Maheshwari, Bel Air, MD (US); James Joseph Velten, Baltimore, MD (US)

(73) Assignee: MRA Systems, Inc., Baltimore, MD (US)

( * ) Notice: Subject to any disclaimer, the term of this patent is extended or adjusted under 35 U.S.C. 154(b) by 0 days.

(21) Appl. No.: 13/210,483

(22) Filed: Aug. 16, 2011

(65) Prior Publication Data

US 2011/0297325 A1    Dec. 8, 2011

Related U.S. Application Data

(62) Division of application No. 12/345,701, filed on Dec. 30, 2008, now Pat. No. 8,128,775.

(51) Int. Cl.
  *B29C 65/00* (2006.01)
  *B32B 37/00* (2006.01)

(52) U.S. Cl.
  USPC .......................................... 156/513; 156/382

(58) Field of Classification Search
  USPC .............. 156/252, 253, 256, 245, 212, 307.3, 156/309.6, 513, 514, 381, 382; 264/156, 264/257, 258, 316, 101, 154, 294, DIG. 57, 264/DIG. 70, DIG. 78; 425/290, DIG. 37
  See application file for complete search history.

(56) References Cited

U.S. PATENT DOCUMENTS

| | | | |
|---|---|---|---|
| 3,787,546 A | 1/1974 | Pratt et al. | |
| 4,160,055 A | 7/1979 | Reed | |
| 4,486,372 A | 12/1984 | Millard et al. | |
| 5,126,091 A * | 6/1992 | Melton | 264/257 |
| 5,141,690 A | 8/1992 | Marshall | |
| 5,246,520 A | 9/1993 | Scanlon et al. | |
| 5,252,279 A * | 10/1993 | Gore et al. | 264/154 |
| 5,268,055 A | 12/1993 | Bales et al. | |
| 5,637,272 A | 6/1997 | Yamamoto et al. | |
| 6,190,602 B1 | 2/2001 | Blaney et al. | |
| 6,203,738 B1 | 3/2001 | Vaders | |
| 6,451,241 B1 | 9/2002 | Ohliger et al. | |
| 7,347,961 B2 | 3/2008 | Obrachta et al. | |

FOREIGN PATENT DOCUMENTS

WO       9322128       11/1993

* cited by examiner

*Primary Examiner* — Linda L Gray

(74) *Attorney, Agent, or Firm* — John Colligan; Gary M. Hartman; Domenica N. S. Hartman

(57) ABSTRACT

A process and apparatus for producing perforated composite structures, such as acoustic skins suitable for aircraft engine nacelle and duct components. The process includes placing a mat member, a non-impregnated fabric member, and a resin film on a tool surface so that pins disposed on the mat member project through the fabric member and resin film to define holes therein. The fabric member is between the mat member and resin film, and the fabric member and resin film define a stack that conforms to the mat member and tool surface. A caul member is then placed on the stack so that apertures in the caul member are penetrated by the pins. The stack is heated to melt the resin film and cause molten resin to infuse the fabric member and yield a resin-infused fabric stack, after which the molten resin within the resin-infused fabric stack is at least partially cured.

6 Claims, 3 Drawing Sheets

PROCESS AND APPARATUS FOR PRODUCING COMPOSITE STRUCTURES

This is a division patent application of U.S. patent application Ser. No. 12/345,701, filed Dec. 30, 2008, now U.S. Pat. No. 8,128,775.

BACKGROUND OF THE INVENTION

The present invention generally relates to molding processes and equipment for producing composite articles. More particularly, this invention relates to a molding process for producing perforated composite structures suitable for use in, as examples, nacelle and reverser acoustic panels of gas turbine engines.

A typical construction used in aircraft engine nacelle components (such as the engine inlet, thrust reverser cowls, and blocker doors) and engine duct flow surfaces is a sandwich-type layered structure comprising a core material between a pair of thinner sheets or skins, one of which is perforated. The core material is typically a lightweight honeycomb metallic or composite material. A variety of metallic and composite materials can also be used for the perforated (acoustic) skin, with common materials including aluminum alloys, fiberglass, and fabric materials (for example, a graphite fabric) impregnated with resin (for example, an epoxy resin). The perforations in the acoustic skin are the result of an acoustic treatment by which numerous small through-holes are formed to suppress noise by channeling pressure waves associated with sound into the open cells within the core, where the energy of the waves is dissipated through friction (conversion to heat), pressure losses, and cancellation by wave reflection.

A conventional process for producing perforated composite skins is to impregnate a graphite fabric with resin and then precure the impregnated skin. Pre-impregnated skins are bonded to opposite surfaces of a core material with adhesive under pressure and heat, typically performed in an autoclave, during which final curing occurs. Alternative conventional processes include co-curing where the skins are not pre-cured but are cured as part of the process of curing the adhesive to skin bond. Disadvantages associated with these processes include long cycle times, high capital investment, and difficulty when attempting to implement for complex geometries. Alternatives to the use of an autoclave include resin transfer molding (RTM) and vacuum-assisted resin transfer molding (VaRTM) processes.

For perforated skins used in some gas turbine engine applications, holes on the order of about 0.03 to about 0.06 inch (about 0.75 to about 1.5 mm) in diameter and hole-to-hole spacings of about 0.06 to about 0.12 inch (about 1.5 to about 3 mm) are typical, resulting in acoustic hole patterns containing seventy-five holes or more per square inch (about twelve holes or more per square centimeter) of treated surface. Given the large number of holes necessary to acoustically treat nacelle components and acoustic panels, rapid and economical methods for producing the holes are desirable.

Common processes currently employed to produce acoustic holes in acoustic skins include punching, mechanical drilling, and pin molding. Each of these processes has its limitations. For example, punching is typically practical for only relatively thin skins of one or two plies, and is often limited to producing fiberglass acoustic skins Mechanical drilling, which is often employed with graphite composite skins, typically drills one, two, or four holes at a time in a skin cured to its finished geometric shape. In addition to limited speed, mechanical drilling processes tend to be expensive due to the special tooling and machinery required to place the holes in the proper orientation on the contoured skin. Pin molding typically entails forcing a pre-impregnated composite skin material onto metallic or nonmetallic pin mats, after which the skin material undergoes an autoclave cure followed by removal of the pin mats. Such a process is slow and labor intensive with significant recurring costs arising from the need to replace worn pin mats. In addition, both mechanical drilling and forcing sharp pins through fibrous pre-impregnated materials result in breakage of fibers and a reduction of optimum laminate skin strength. None of these processes are well suited for perforating composite skins at relatively high rates while incurring minimal equipment, labor, and recurring costs.

BRIEF DESCRIPTION OF THE INVENTION

The present invention provides a process and apparatus for producing perforated composite structures, particular but nonlimiting examples of which include composite acoustic skins suitable for aircraft engine nacelle components, such as the engine inlet, thrust reverser cowls, and blocker doors, engine duct acoustic panels, surfaces that might be employed for aircraft surface skin laminar flow control, and a variety of other perforated layered structures.

According to a first aspect of the invention, the process includes placing at least one mat member, at least one non-impregnated fabric member, and at least one resin film on a tool surface so that pins disposed on the mat member project through the non-impregnated fabric member and the resin film to define holes therein. The non-impregnated fabric member is between the mat member and the resin film, and the non-impregnated fabric member and the resin film comprise a stack that conforms to the mat member and the tool surface. A caul member is placed on the stack to apply pressure to the stack. The caul member has apertures that are penetrated by the pins as a result of the caul member being placed on the stack. The stack is then bagged and heated to melt the resin film and cause molten resin thereof to infuse the non-impregnated fabric member and yield a resin-infused fabric stack. The molten resin within the resin-infused fabric stack is then at least partially cured, such that the partially-cured resin-infused fabric stack comprises the holes previously defined with the pins in the non-impregnated fabric member. To achieve maximum performance, the partially-cured resin-infused fabric stack subsequently undergoes post-curing either before or after removal from the tool surface and mat member.

A second aspect of the invention is an apparatus that can be employed by the above process. The apparatus includes a tool having a tool surface, at least one mat member that conforms to the tool surface, and a caul member. The mat member comprises pins and the caul member comprises apertures therein that are complementary in size and location to the pins of the mat member to enable the pins to penetrate the apertures when the caul member is placed on the mat member. The apparatus is further capable of heating the tool surface, the mat member, and the caul member.

A significant advantage of this invention is the capability of producing a perforated composite structure by infusing a dry fabric member with a resin so that the composite structure and its perforations are simultaneously formed in essentially a single step, instead of requiring a post-cure punching, drilling, or other process to form the perforations. Another advantage is that the fabric member is not impregnated with resin at the time the pins of the mat member are introduced into the fabric member, enabling the pins to more easily slip through the fibrous construction of the fabric member and eliminating or at least significantly reducing the risk of broken fibers. Other advantages include the potential for reduced cycle times and significantly reduced capital equipment investment, including the ability to perform the curing process without an autoclave, the use of lower curing temperatures that allow the use of lower-cost tooling, and the use of relatively low-cost materials and structures for the mat and caul members.

Other aspects and advantages of this invention will be better appreciated from the following detailed description.

DETAILED DESCRIPTION OF THE INVENTION

Figure 1:
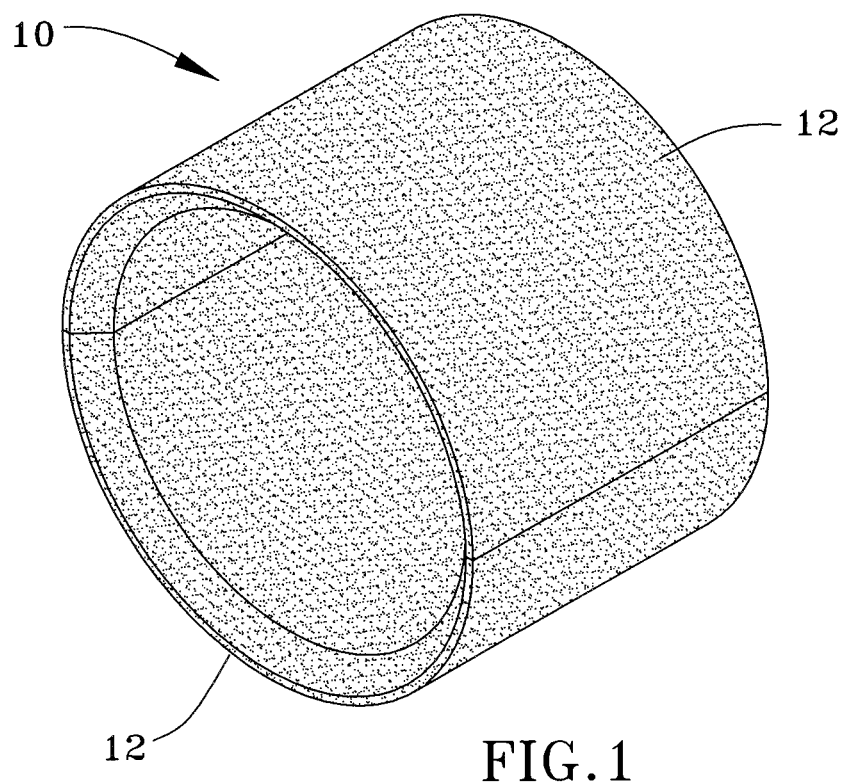
FIG. 1 is a schematic perspective view of a nacelle component for an aircraft engine.

FIG. 1 is representative of a two-piece nacelle component 10 for an aircraft engine nacelle, examples of which include the inner inlet barrel, thrust reverser cowls, and blocker doors. For purposes of discussing particular aspects of the present invention, the construction for each half 12 of the component 10 will be described as including a core layer disposed between a pair of skins, with one or more additional layers also possible. According to a preferred aspect of the invention, at least one of the skins is an acoustic composite skin that can be produced using processing steps of the present invention. While the invention will be described in reference to the two-piece nacelle component 10 of FIG. 1, it should be understood that the invention is applicable to a variety of components that might benefit from having a perforated composite component, including but not limited to other engine duct acoustic panels and a variety of other perforated layered structures.

The core layer of each half 12 of the component 10 has an open-cell or otherwise porous construction. Nonlimiting examples of open-cell or porous core layers include open-cell ceramic, metal, carbon and thermoplastic foams and honeycomb-type materials formed of, for example, NOMEX® aramid fibers. Such core materials and constructions are well known in the art, and therefore will not be discussed in any detail.

The conventional state of the art for composite skins of the type used in the component 10 is a resin-impregnated fabric. Prior to impregnation with resin, the fabric may be referred to as a "dry" fabric, and may comprise a stack of two or more layers (plies) of woven or nonwoven fibers that may be formed of a variety of materials, for example carbon (e.g., graphite fibers), glass (e.g., fiberglass), polymer (e.g., Kevlar® fibers), and ceramic (e.g., Nextel® fibers). While conventional practice has been to resin-impregnate the fabric prior to performing an acoustic treatment by which the resin-impregnated fabric is perforated, composite skins produced by this invention undergo perforation simultaneously with a resin-infusion process, as discussed below.

Figure 3:
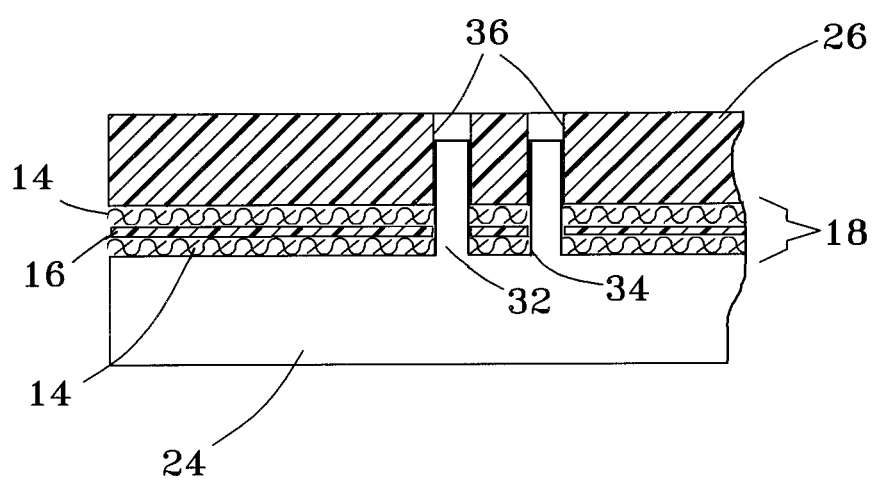
FIG. 3 is a detailed view of an edge of the molding apparatus of FIG. 3 prior to performing a resin transfer molding process on the dry fabric material.
Figure 2:
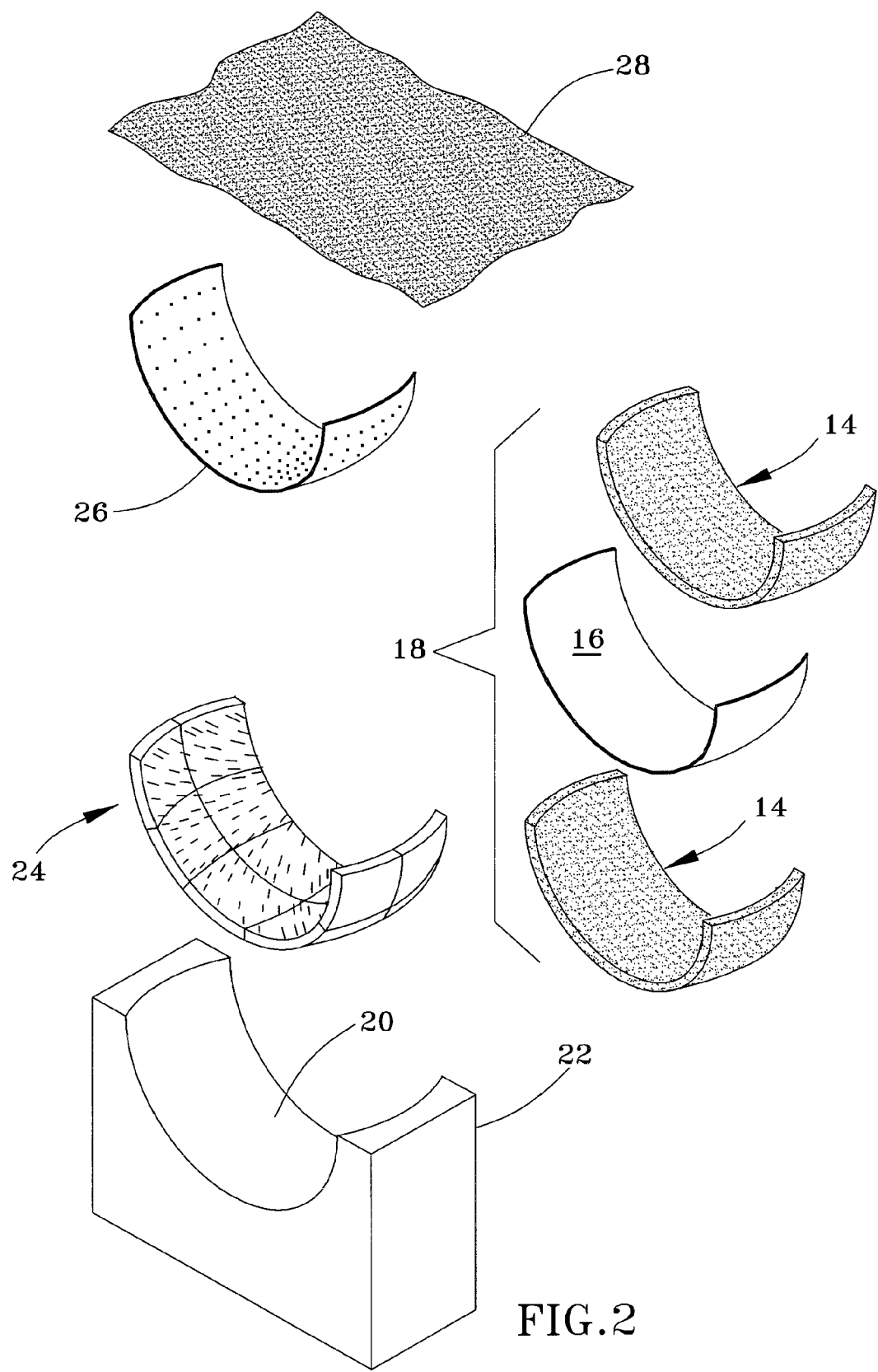
FIG. 2 is a schematic exploded view showing a molding apparatus, dry fabrics, and resin film for producing an acoustic composite skin for the nacelle component of FIG. 1.
Figure 4:
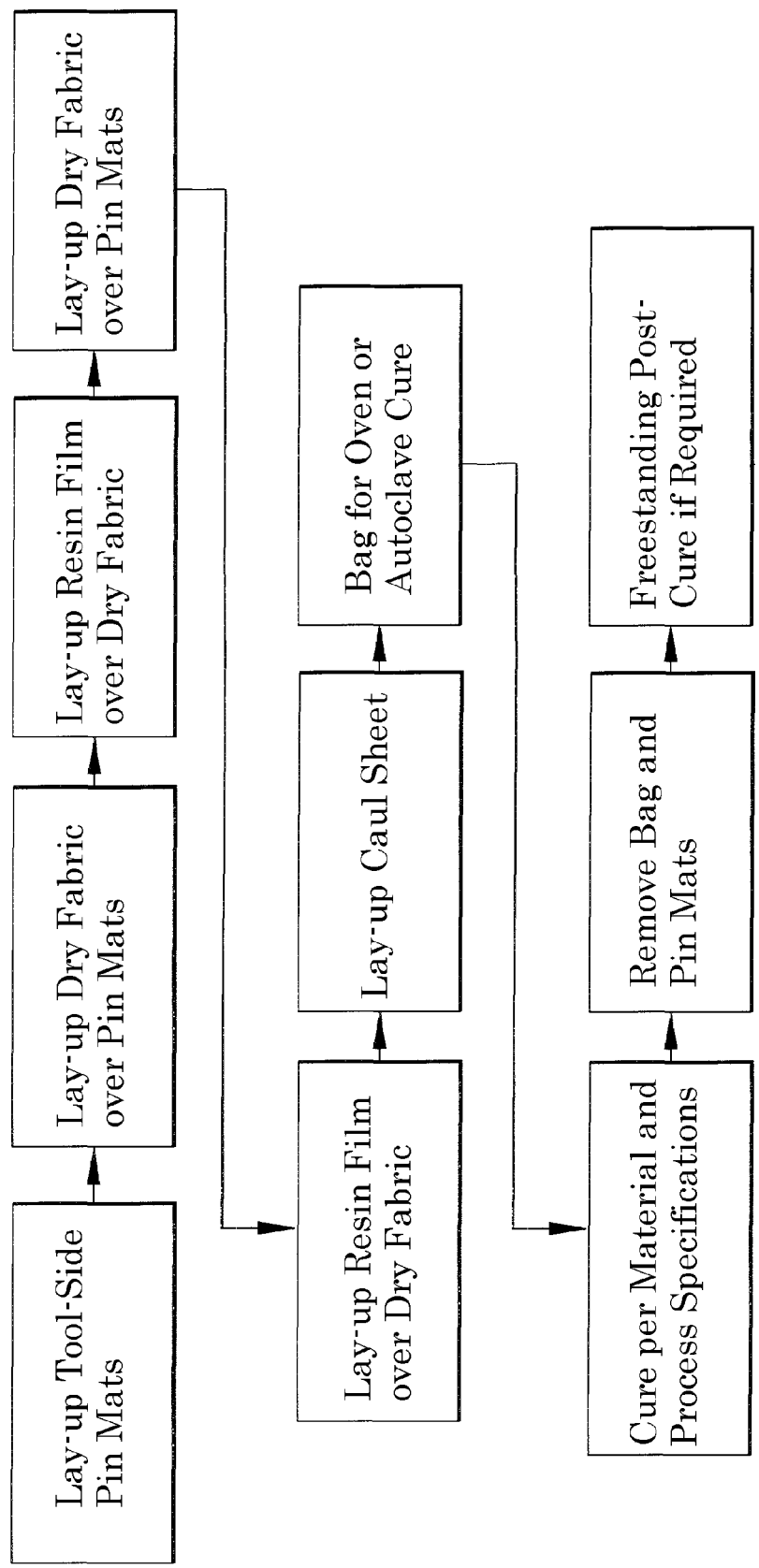
FIG. 4 represents processing steps performed to produce an acoustic composite skin with the apparatus of FIGS. 2 and 3.

FIGS. 2 and 3 schematically show a pair of dry fabrics 14 of a type described above for an acoustic composite skin of this invention, and FIG. 4 is a flow chart for a resin infusion molding process by which, according to a particularly preferred aspect of the invention, acoustic holes 34 can be formed in the dry fabrics 14 during infusion of the fabrics 14 with a resin. As noted above, each dry fabric 14 may comprise one or more layers (plies) of woven or nonwoven fibers, including but not limited to graphite, glass, Kevlar®, and Nextel® fibers. Suitable individual thicknesses for the fabrics 14 will depend on the particular application of the composite structure being produced. In the case of using two fabrics 14 shown in FIGS. 2 and 3 for the nacelle component 10 of FIG. 1, a typical thickness for each fabric 14 is about 1.3 to about 2.5 millimeters, though much lesser and greater thicknesses are also foreseeable.

According to another particularly preferred aspect of the invention, the resin is initially provided in the form of at least one film 16 that is placed between the fabrics 14 during lay-up for the molding process, and then melts and infuses the fabrics 14 during the molding process. The principal role of the resin is to form a matrix material for the fibrous material within the dry fabrics 14, and the resin film 16 preferably provides a sufficient quantity of resin for this purpose. For example, if two fabrics 14 with thicknesses about 1.3 to about 2.5 millimeters are used to form an acoustic composite skin for the component 10, a single resin film 16 having a uniform thickness of about 1 to about 2 millimeters is suitable for placement between the fabrics 14 to achieve a desirable fiber/resin volume within the skin, though lesser and greater resin film thicknesses are also foreseeable. As a matrix material, the resin should be compositionally compatible with the dry fabrics 14, and may be chosen to contribute to the structural strength and other physical properties of the composite skin produced with the dry fabrics 14. Additionally, because the resin will usually contact other layers, such as the core layers of the component 10, the resin will usually be chosen for compositional compatibility with the materials of the core layers and, if present, any additional layers of the component 10 that the resin may contact. The resin must also be capable of curing under temperature conditions that will not thermally degrade or otherwise be adverse to the materials of the dry fabrics 14 and core layer. Depending on the composition of the fibers that make up the fabrics 14, a wide variety of polymeric materials can be chosen as the resin film 16, including an epoxy system commercially available under the name CYCOM® 5208 from Cytec Industries, Inc., and a toughened epoxy system commercially available under the name HEXPLY® M36 from Hexcel Composites. These epoxy resin systems have cure temperatures of about 200° C. or less, though resin systems with higher cure temperatures are also within the scope of this invention.

FIG. 2 schematically represents the dry fabrics 14 and resin film 16 as forming a bondment stack 18 placed on a tool surface 20 of a tool 22 suitable for resin-infusing the fabrics 14 to produce an acoustic composite skin for one half 12 of the two-piece component 10 of FIG. 1. FIG. 2 further shows multiple pin mandrels or mats 24 and a caul sheet 26 as included with the stack 18 on the tool surface 20. The pin mats 24 are represented as being placed side-by-side and directly on the tool surface 20, followed by one of the dry fabrics 14, the resin film 16, the second dry fabric 14, and then the caul sheet 26. The caul sheet 26 is optional but preferred for uniformly applying pressure to the fabric/film bondment stack 18. The fabrics 14, resin film 16, mats 24 and caul sheet 26 are sufficiently pliable and/or appropriately shaped so that they conform to the surface 20 of the tool 22. Other possible components of the molding apparatus will depend on the technique used to resin-infuse the dry fabrics 14 and cure the resulting resin-infused acoustic composite skin. For example, in embodiments of the invention in which an autoclave process is used, the stack 18, mats 24 and caul sheet 26 are preferably covered by an air-impermeable bag 28 to enable a vacuum to be drawn between the tool surface 20 and the bag 28, such that the bag 28 is able to compress the fabrics 14 between the mats 24 and caul sheet 26 and resin from the resin film 16 will be drawn into and infuse both fabrics 14.

The mats 24 have pins 32 that project from their upper surfaces. The pins 32 are intended to form the desired acoustic holes 34 for the acoustic composite skin, and therefore must be of sufficient length to completely penetrate the dry fabrics 14 and resin film 16. In a preferred embodiment of the invention, the pins 32 also protrude into holes 36 that are preformed in the caul sheet 26 (FIG. 3). Furthermore, the pins 32 are preferably in a well-defined pattern and have diameters chosen to produce the desired diameters for the acoustic holes 34, for example, on the order of about 0.03 to about 0.06 inch (about 0.75 to about 1.5 mm) with a hole-to-hole spacing of about 0.06 to about 0.12 inch (about 1.5 to about 3 mm). Other hole sizes and spacings are foreseeable and therefore also within the scope of the invention.

In order to penetrate the fabrics 14, the mats 24 and their pins 32 are preferably formed of a material that is relatively rigid in comparison to the fabrics 14, yet allow the mats 24 to conform to the tool surface 20. To minimize recurring costs for the molding process, nonlimiting examples of suitable materials for the mats 24 and pins 32 include polyethylene, polypropylene, or nylon. A particularly suitable construction for the mats 24 and pins 32 is an injection molding that yields mats 24 having integrally-formed pins 32 and a contoured shape that approximately conforms to the tool surface 20. While mats 24 and pins 32 formed of a polymer will likely be suitable for a variety of molding processes and applications, materials capable of sustaining higher temperatures may be preferred or necessary for other applications, in which case mats 24 and pins 32 may be formed of a metal such as aluminum or steel. Still other materials are also within the scope of the invention. Multiple pin mats 24 are preferred over a single mat to facilitate removal of each mat 24 following resin-infusion of the fabrics 14 and, because of their relative rigidity, conformance to the tool surface 20, though the use of a single pin mat is also within the scope of the invention.

Suitable materials for the caul sheet 26 include elastomers such as RTV silicone rubber. As noted above, the caul sheet 26 can be preformed to have preformed apertures 36 that are complementary in size and location to the pins 32 of the mats 24, so that the apertures 36 receive the pins 32 and provide a mechanical locating and locking capability to ensure an arrangement of the mats 24 that will yield a uniform placement of the pins 32 and the resulting acoustic holes 34.

Once the mats 24, fabric/resin bondment stack 18, caul sheet 26 and bag 28 are placed on the tool surface 20, the stack 18 is heated to a temperature sufficient to melt the resin film 16 and infuse the molten resin into the fabrics 14. The resulting resin-infused fabric stack can then be heated on the tool 22 to a temperature and for a duration sufficient to at least partially cure the resin. The melting and curing steps can be performed in an evacuated oven or in an autoclave to apply pressure to the stack 18. The choice of using an oven under vacuum or an autoclave process will depend on the characteristics of the selected resin film 16 and the consolidation required for the resin and dry fabric stack 18. The infusion/impregnation and curing temperatures, vacuum/pressure levels, and other parameters of the infusion and curing cycles will depend on the particular materials used, and can be determined by routine experimentation.

FIG. 4 is a flow chart more particularly identifying individual steps performed when employing an oven or autoclave molding technique to produce acoustic composite skins with the apparatus of FIGS. 2 and 3. More particularly, FIG. 4 represents the molding process as comprising the installation of the pin mats 24 on the surface 20 of the tool 22, and then laying-up a dry fabric 14, a layer of resin film 16, a second dry fabric 14, and a second resin film 16. As a result of the laying-up process, the pins 32 of the mats 24 are forced through the resulting stack 18 to define aligned holes 34 in the fabrics 14, as well as the resin films 16. The caul sheet 26 is then placed on the stack 18 so that the pins 32 are received in their apertures 36, resulting in the assemblage represented in FIG. 3. The bag 28 can then be applied and a cure cycle performed, during which the resin melts to achieve infusion of the fabrics 14, followed by at least partial curing of the resin to form the matrix of the desired composite skin. During melting and curing of the resin, the desired acoustic holes 34 for the composite skin are molded in-situ around the mat pins 32. Thereafter, the bag 28 is removed, the resulting resin-infused fabric stack is removed from the tool 22, and the mats 24 and caul sheet 26 are removed from the fabric stack. A post cure can then be performed on the freestanding fabric stack to yield an acoustic composite skin. The process represented in FIG. 4 has been successfully completed on test components formed on candidate materials for acoustic composite skins, as well as specimens of acoustic composite skins.

In view of the above, it can be appreciated that a composite skin and its acoustic holes 34 can be formed simultaneously by infusion of the dry fabrics 14 in essentially a single step, instead of being pre-impregnated with a resin, cured, and then undergoing punching or drilling or being forced onto a pinned mat prior to autoclaving. Other processing advantages include the relatively low cost tooling made possible with the pin mats 24 and caul sheet 26. The mats 24 and caul sheet 26 can be replaced as needed at minimal cost, and the molding process allows for the use of low viscosity resins that readily flow and cure at moderate elevated temperatures. An additional advantage is the quality of the acoustic holes 34 produced by the molding process as a result of avoiding damage and exposure of fibers within the fabrics 14, and the creation of resin-rich hole walls that promote moisture sealing.

While the invention has been described in terms of specific embodiments, it is apparent that other forms could be adopted by one skilled in the art. For example, any number of fabrics 14 and resin films 16 could be used to form the bondment stack 18, the physical configuration of the composite skin could differ from that described, and materials and processes other than those noted could be used. Therefore, the scope of the invention is to be limited only by the following claims.

The invention claimed is:

1. An apparatus for producing a composite structure comprising a resin-infused fabric stack by infusing at least one non-impregnated fabric member with a molten resin, the apparatus comprising:

a tool having a tool surface, at least one mat member that conforms to the tool surface, and a caul member, the mat member comprising pins projecting from a surface thereof that is adapted to receive the non-impregnated fabric member and a source of the molten resin, the caul member comprising apertures therein that are complementary in size and location to the pins of the mat member to enable the pins to penetrate the apertures when the caul member is placed on the non-impregnated fabric member and the source of the molten resin when received on the mat member, the apertures of the caul member enabling the molten resin to flow around the pins of the mat member as the non-impregnated fabric member is infused with the molten resin to yield the resin-infused fabric stack and yield holes in the resin-infused fabric stack that have resin-rich walls molded in-situ around the pins of the mat member; and means for causing the source of the molten resin to melt by heating the tool surface, the mat member, and the caul member.

2. The apparatus according to claim 1, wherein the mat member is one of a plurality of mat members comprising pins.

3. The apparatus according to claim 1, wherein the mat member is formed of a polymeric material.

4. The apparatus according to claim 1, wherein the mat member is formed of a metallic material.

5. The apparatus according to claim 1, wherein the caul member is formed of an elastomeric material.

6. The apparatus according to claim 1, further comprising means for applying a vacuum or pressure to the mat member and the caul member.

\* \* \* \* \*